(12) United States Patent
Qi et al.

(10) Patent No.: US 12,264,608 B2
(45) Date of Patent: Apr. 1, 2025

(54) CATALYZED GASOLINE PARTICULATE FILTER

(71) Applicant: BASF MOBILE EMISSIONS CATALYSTS LLC, Iselin, NJ (US)

(72) Inventors: Yun Fei Qi, Shanghai (CN); Jun Cong Jiang, Shanghai (CN); Attilio Siani, Shanghai (CN); Weiyong Tang, Shanghai (CN)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 82 days.

(21) Appl. No.: 17/594,008

(22) PCT Filed: Apr. 20, 2020

(86) PCT No.: PCT/US2020/028937
§ 371 (c)(1),
(2) Date: Sep. 30, 2021

(87) PCT Pub. No.: WO2020/219376
PCT Pub. Date: Oct. 29, 2020

(65) Prior Publication Data
US 2022/0154612 A1 May 19, 2022

(30) Foreign Application Priority Data
Apr. 22, 2019 (WO) ................ PCT/CN2019/083641

(51) Int. Cl.
*F01N 3/035* (2006.01)
*B01J 23/42* (2006.01)
(Continued)

(52) U.S. Cl.
CPC .............. *F01N 3/035* (2013.01); *B01J 23/42* (2013.01); *B01J 23/44* (2013.01); *B01J 23/464* (2013.01);
(Continued)

(58) Field of Classification Search
CPC .... B01D 2255/1021; B01D 2255/1023; B01D 2255/1025; B01D 2255/2042;
(Continued)

(56) References Cited

U.S. PATENT DOCUMENTS

| 5,874,057 A | 2/1999 | Deeba et al. |
| 8,066,963 B2 | 11/2011 | Klingmann et al. |

(Continued)

FOREIGN PATENT DOCUMENTS

| WO | WO-2012156883 | * 11/2012 |
| WO | WO-2016187267 | * 11/2016 |
| WO | WO-2018115900 | * 6/2018 |

OTHER PUBLICATIONS

International Search Report dated Jun. 25, 2020, PCT/US2020/28937.

(Continued)

*Primary Examiner* — Phutthiwat Wongwian
*Assistant Examiner* — Diem T Tran
(74) *Attorney, Agent, or Firm* — DLA Piper LLP (US)

(57) ABSTRACT

The present invention relates to a catalyzed particulate filter and methods comprising the filter for treatment of an exhaust gas from a gasoline engine, the catalyzed particulate filter comprising a gasoline particulate filter (GPF); a major catalytic layer coated onto or within an inlet side, an outlet side, or both sides of the GPF surfaces, the major catalytic layer comprising a first composition, wherein the first composition comprising a first support material; and a first platinum group metal (PGM); and a minor functional material layer placed onto or within an inlet side, an outlet side, or both sides of the GPF surfaces; the minor catalytic layer comprising a second composition; wherein the major catalytic layer has a higher loading than the minor functional material layer; the minor functional material layer is placed (Continued)

on top of the major catalytic layer, or the major catalytic material layer is placed on top of the minor functional layer. The catalyzed particulate filter provides an improved catalytic efficiency in conjunction with an efficient filter.

17 Claims, 6 Drawing Sheets

(51) Int. Cl.
| | |
|---|---|
| *B01J 23/44* | (2006.01) |
| *B01J 23/46* | (2006.01) |
| *B01J 35/00* | (2006.01) |
| *B01J 35/40* | (2024.01) |
| *B01J 37/00* | (2006.01) |
| *B01J 37/02* | (2006.01) |
| *F01N 3/10* | (2006.01) |

(52) U.S. Cl.
CPC ............... *B01J 35/19* (2024.01); *B01J 35/40* (2024.01); *B01J 37/0036* (2013.01); *B01J 37/0201* (2013.01); *B01J 37/0215* (2013.01); *F01N 3/101* (2013.01)

(58) Field of Classification Search
CPC .... B01D 2255/2065; B01D 2255/2092; B01D 2255/407; B01D 2255/902; B01D 2255/903; B01D 2255/908; B01D 2255/9155; B01D 53/945; B01J 23/42; B01J 23/44; B01J 23/464; B01J 23/63; B01J 35/0006; B01J 35/002; B01J 35/023; B01J 37/0036; B01J 37/0201; B01J 37/0215; F01N 3/035; F01N 3/101
See application file for complete search history.

(56) References Cited

U.S. PATENT DOCUMENTS

| | | |
|---|---|---|
| 8,173,087 B2 | 5/2012 | Wei et al. |
| 8,815,189 B2 | 8/2014 | Arnold et al. |
| 2004/0001781 A1 | 1/2004 | Kumar et al. |
| 2006/0263284 A1 | 11/2006 | Larcher et al. |
| 2010/0048384 A1* | 2/2010 | Fujdala ................ B01J 37/0244 |
| | | 502/67 |
| 2011/0030346 A1 | 2/2011 | Neubauer et al. |
| 2013/0243659 A1 | 9/2013 | Sutton et al. |
| 2019/0091662 A1 | 3/2019 | Camm et al. |

OTHER PUBLICATIONS

Extended European Search Report dated Dec. 19, 2022, of counterpart European Patent Application No. 20796006.3.

* cited by examiner

CATALYZED GASOLINE PARTICULATE FILTER

CROSS-REFERENCE TO RELATED APPLICATIONS

This application is a national stage filing under 35 U.S.C. § 371 of International Application No. PCT/US2020/028937, filed on Apr. 20, 2020, which claims priority to International Application No. PCT/US2020/028937, filed on Apr. 22, 2019, the content of each application is incorporated herein by reference in its entirety.

TECHNICAL FIELD

The present invention relates to a catalyzed particulate filter for exhaust gas treatment from a gasoline engine. The catalyzed particulate filter provides an improved catalytic efficiency in conjunction with an efficient filter.

BACKGROUND

Particulate emissions for gasoline engines are being subject to regulations, including Euro 6 (2014) standards. Certain gasoline direct injection (GDI) engines have been developed whose operating regimes result in the formation of fine particulates. Aftertreatment systems for gasoline engines need to achieve particulate matter standards. In contrast to particulates generated by diesel lean burning engines, the particulates generated by gasoline engines, such as GDI engines, tend to be finer and in lesser quantities. This is due to the different combustion conditions of a diesel engine as compared to a gasoline engine. For example, gasoline engines run at a higher temperature than diesel engines. Also, hydrocarbon components are different in the emissions of gasoline engines as compared to diesel engines.

Emissions of unburned hydrocarbons, carbon monoxide and nitrogen oxide contaminants continue to be regulated. Catalytic converters containing a three-way conversion (TWC) catalyst are accordingly located in the exhaust gas line of internal combustion engines. Such catalysts promote the oxidation by oxygen in the exhaust gas stream of unburned hydrocarbons and carbon monoxide as well as the reduction of nitrogen oxides to nitrogen.

A catalytically active particulate filter is provided in U.S. Pat. No. 8,066,963. The particulate filter of U.S. Pat. No. 8,066,963 comprises a filter body and a catalytically active coating consisting of two layers. The layers are arranged such that the second layer is in direct contact with the incoming gas and covers the first layer completely on the exhaust gas side. Both layers contain alumina. The first layer contains palladium. The second layer contains rhodium.

A catalyzed particulate trap comprising a TWC catalyst coated onto or within a particulate trap is provided in U.S. Pat. No. 8,173,087. The TWC catalyst can be coated on an inlet side, an outlet side, or both of the filter. U.S. Pat. No. 8,173,087 identifies that some of the particulates from a GDI gasoline engine could avoid being trapped by the filter by flowing though the filter walls when the filter is fresh and that to deal with the initial filtration efficiency problem, a thin layer of catalytic washcoat can be coated onto the filter wall.

A gasoline engine emissions treatment system having particulate filters is also provided in U.S. Pat. No. 8,815,189. The three-way conversion (TWC) catalysts or oxidation catalysts of U.S. Pat. No. 8,815,189 are coated onto and within a particulate filter, which has a coated porosity that is substantially the same as its uncoated porosity.

A gasoline engine typically operates under near stoichiometric reaction conditions that oscillate or are perturbated slightly between fuel rich and fuel lean air to fuel ratios (A/F ratios) (A/F=14.7 or lambda=1). Use of "stoichiometric" herein refers to the conditions of a gasoline engine, accounting for the oscillations or perturbations of A/F ratios near stoichiometric. As is well known in the art, when operating with stoichiometric premixed gasoline/air, the PM level is comparable to the non-fuel level; thus premixed-stoichiometric mixture combustion does not significantly generate particulates. For fuel rich premixed gasoline/air, PM increases dramatically when lambda is less than 0.7 to 0.8.

On Dec. 23, 2016, the Ministry of Environmental Protection (MEP) of the People's Republic of China published the final legislation for the China 6 limits and measurement methods for emissions from light-duty vehicles (GB18352.6-2016; hereafter referred to as China 6), which is much stricter than the China 5 emission standard. Especially, China 6b targets reductions of THC and CO emissions by 50 percent from China 5 levels, as well as 42 percent reduction of NOx. In addition, China 6b incorporates limits on nitrous oxide ($N_2O$) and particulate matter (PM); and adopts the on-board diagnostic (OBD) requirements. Furthermore, it is implemented that tests should be tested under World Harmonized Light-duty Vehicle Test Cycle (WLTC). WLTC includes many steep accelerations and prolong high speed requirements, which demands high power output that could have caused "open-loop" situation (as fuel paddle needs to be pushed all the way down) at extended time (e.g., >5 sec) under rich (lambda <1) or under deep rich (lambda <0.8) condition.

As standards become more stringent, however, there is a need to provide a catalyzed filter that provides an improved catalytic efficiency in conjunction with an efficient filter so that regulated HC, NOx, and CO conversions can be achieved while meeting particulate matter emissions.

SUMMARY

The present invention relates to a catalyzed particulate filter for exhaust gas from a gasoline engine. The catalyzed particulate filter provides an improved catalytic efficiency in conjunction with an efficient filter.

Aspects include catalyzed particulate filters for exhaust gas from a gasoline engine comprising: a gasoline particulate filter (GPF); a major catalytic layer coated onto or within an inlet side, an outlet side, or both sides of the GPF surfaces, the major catalytic layer comprising a first composition, wherein the first composition comprising a first hydrothermally stable support material; and a first platinum group metal (PGM); and a minor functional material layer placed onto or within an inlet side, an outlet side, or both sides of the GPF surfaces; the minor functional material layer comprising a second composition.

Other aspects include methods for the treatment of exhaust gas from a gasoline engine comprising providing a particulate filter; and conducting the exhaust gas from the engine through the particulate filter.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

With respect to the terms used in this disclosure, the following definitions are provided.

Throughout the description, including the claims, the term "comprising one" or "comprising a" should be understood as being synonymous with the term "comprising at least one", unless otherwise specified, and "between" or "to" should be understood as being inclusive of the limits.

The terms "a", "an" and "the" are used to refer to one or to more than one (i.e., to at least one) of the grammatical object of the article.

The term "and/or" includes the meanings "and", "or" and also all the other possible combinations of the elements connected to this term.

All percentages and ratios are mentioned by weight unless otherwise indicated.

Typical catalyzed particulate filters suitable for use in conjunction with gasoline include a gasoline particulate filter (GPF); and a TWC catalyst coated onto or within an inlet side, an outlet side, or both sides of the GPF surfaces for treatment of an exhaust stream comprising hydrocarbons, carbon monoxide, nitrogen oxides, and particulates. We have surprisingly found that besides the major catalytic layer coated onto or within the GPF surface, putting a minor functional material layer in a particulate form onto or within the GPF surface provides a significantly improved catalytic efficiency in conjunction with an efficient filter without unduly increasing back pressure.

Thus, according to one aspect of the invention, provided is a catalyzed particulate filter for exhaust gas from a gasoline engine comprising:

(1) a gasoline particulate filter (GPF);
(2) a major catalytic layer coated onto or within an inlet side, an outlet side, or both sides of the GPF surfaces, the major catalytic layer comprising a first composition, wherein the first composition comprising a first support material; and a first platinum group metal (PGM); and
(3) a minor functional material layer placed onto or within an inlet side, an outlet side, or both sides of the GPF surfaces; the minor catalytic layer comprising a second composition;
(4) wherein the major catalytic layer has a higher loading than the minor functional material layer;
(5) the minor functional material layer is placed on top of the major catalytic layer, or the major catalytic material layer is placed on top of the minor functional layer.

Figure 6:
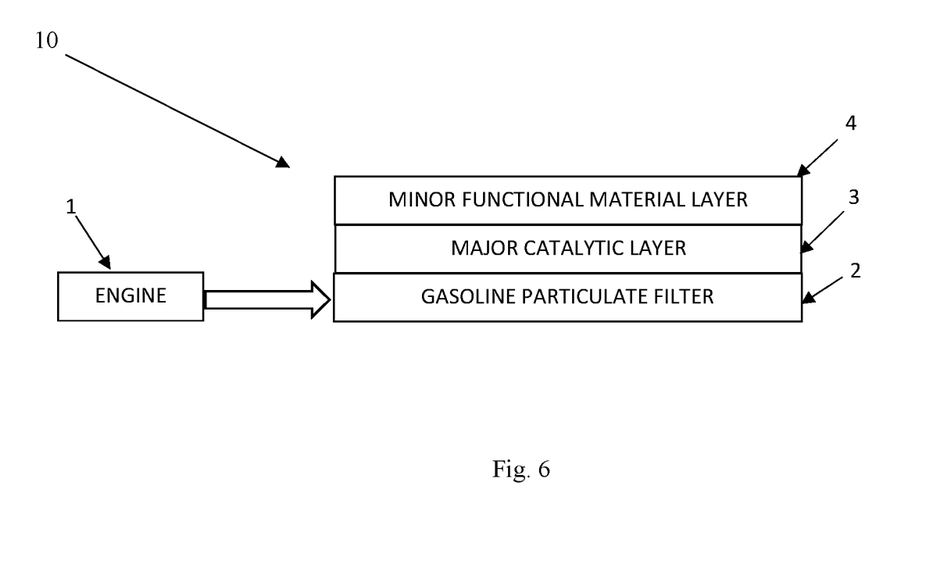
FIG. 6 is a schematic showing an exemplary catalyzed particulate filter for exhaust gas from a engine.

FIG. 6 shows a schematic of an exemplary catalyzed particulate filter 10 for exhaust gas from an engine 1 comprising a gasoline particulate filter (GPF) 2; a major catalytic later 3; and (3) a minor functional material layer 4.

Reference to a "support" in a catalyst washcoat layer refers to a material that receives precious metals, stabilizers, promoters, binders, and the like through association, dispersion, impregnation, or other suitable methods. Examples of supports include, but are not limited to, high surface area refractory metal oxides and composites containing oxygen storage components. High surface refractory metal oxide supports refer to support particles having pores larger than 20 Å and a wide pore distribution. High surface area refractory metal oxide supports, such as alumina support materials, also referred to as "gamma alumina" or "activated alumina," typically exhibit a fresh BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, alpha alumina, bulk ceria, zirconia, silica, titania, a rare earth metal oxide other than ceria, and other materials are known for such use.

In one or more embodiments, the particle size distribution of the support material is in the range of 500 nm to 50 μm. The BET surface area of said support material is in the range of 30-200 $m^2/g$ at fresh state and 15-150 $m^2/g$ after aging at 1000° C. for 4 hours, characterized by 77K nitrogen sorption.

"BET surface area" has its usual meaning of referring to the Brunauer-Emmett-Teller method for determining surface area by $N_2$ adsorption.

One or more embodiments include a high surface area refractory metal oxide support comprising an activated compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria. Examples of composites containing oxygen storage components include, but are not limited to, ceria-zirconia, ceria-zirconia-lanthana. Reference to a "ceria-zirconia composite" means a composite comprising ceria and zirconia, without specifying the amount of either component. Suitable ceria-zirconia composites include, but are not limited to, composites having, for example, 5 percent, 10 percent, 15 percent, 20 percent, 25 percent, 30 percent, 35 percent, 40 percent, 45 percent, 50 percent, 55 percent, 60 percent, 65 percent, 70 percent, 75 percent, 80 percent, 85 percent, 90 percent or even 95 percent of ceria content. Certain embodiments provide that the support comprises bulk ceria having a nominal ceria content of 100 percent (i.e., >99 percent purity).

Reference to oxygen storage component (OSC) refers to an entity that has multivalence state and can actively react with oxidants such as oxygen or nitrous oxides under oxidative conditions; or reacts with reductants such as carbon monoxide (CO) or hydrogen under reduction conditions. Examples of suitable oxygen storage components include ceria. Praseodymia can also be included as an OSC. Delivery of an OSC to the washcoat layer can be achieved by the use of, for example, mixed oxides. For example, ceria can be delivered by a mixed oxide of cerium and zirconium, and/or a mixed oxide of cerium, zirconium, and neodymium. For example, praseodymia can be delivered by a mixed oxide of praseodymium and zirconium, and/or a mixed oxide of praseodymium, cerium, lanthanum, yttrium, zirconium, and neodymium.

Reference to "PGM" means a platinum group metal, while "Pt" refers to platinum, "Pd" refers to palladium, and "Rh" refers to rhodium. It is to be understood that these terms embrace not only the metallic form of these PGMs, but also any metal oxide forms that are catalytically active for emissions reduction. Combinations of metallic and catalytically active metal oxide forms are also contemplated by the invention.

Reference to "gasoline particulate filter" means a filter so sized and configured to trap particulates generated by the combustion reactions in the direct injection gasoline engine. Trapping of particulates can occur, for example, by use of a particulate (or soot) filter, by use of a flow-through substrate having an internal tortuous path such that a change in direction of flow of the particulates causes them to drop out of the exhaust stream, by use of a metallic substrate, such as a corrugated metal carrier, or by other methods known to those skilled in the art. Other filtration devices may be suitable, such as a pipe with a roughened surface that can knock particles out of the exhaust stream. A pipe with a bend may also be suitable.

An exemplary particulate filter is a wall flow filter substrate. Wall flow substrates useful for supporting the catalyst compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 300 flow passages (or "cells") per square inch of cross section, although far fewer may be used. For example, the carrier may have from about 7 to 300, more usually from about 200 to 300, cells per square inch ("cpsi"). The cells can have cross sections that are rectangular, square, circular, oval, triangular, hexagonal, or are of other polygonal shapes. Wall flow substrates typically have a wall thickness between 0.008 and 0.016 inches. Specific wall flow substrates have a wall thickness of between 0.010 and 0.012 inches.

Typical wall flow filters in commercial use are typically formed with lower wall porosities, e.g., from about 42 percent to 65 percent, than the wall flow filters utilized in the invention. In general, the pore size distribution of commercial wall flow filters is typically very broad with a mean pore size smaller than 25 microns.

The porous wall flow filter used in this invention is catalyzed in that the wall of the element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more washcoats of catalytic materials and combinations of one or more washcoats of catalytic materials on the inlet and/or outlet walls of the element.

With reference to a metallic substrate, a useful substrate may be composed of one or more metals or metal alloys. The metallic carriers may be employed in various shapes such as corrugated sheet or monolithic form. Specific metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt percent of the alloy, e.g., 10-25 wt percent of chromium, 3-8 wt percent of aluminum and up to 20 wt percent of nickel. The alloys may also contain small or trace amounts of one or more other metals such as manganese, copper, vanadium, titanium and the like. The surface of the metal carriers may be oxidized at high temperatures, e.g., 1000 degrees centigrade and higher, to improve the resistance to corrosion of the alloys by forming an oxide layer on the surfaces of the carriers. Such high temperature-induced oxidation may enhance adherence of a catalytic material to the carrier.

In one or more embodiments, the second composition comprises a second support material; and a second platinum group metal. In specific embodiments, the first and second support materials are independently selected from the group consisting of alumina, zirconia, ceria, silica, titania, a rare earth metal oxide other than ceria, and mixtures thereof. In specific embodiments, the first and second PGM are independently selected from the group consisting of platinum (Pt), palladium (Pd), rhodium (Rh) and mixtures thereof.

As used herein, the term "mixture" or "combination" refers, but is not limited to, a combination in any physical or chemical form, e.g., blend, solution, suspension, alloy, composite, or the like.

In more specific embodiments, the second composition is the same as the first composition. In other more specific embodiments, the second composition is different from the first composition.

In one or more embodiments, the second PGM is Pt, or Pt and Pd, the second PGM is present in a catalytically effective amount to convert NOx, CO and hydrocarbons in an exhaust gas to $N_2$, $CO_2$ and $H_2O$ and to cause the oxidation of particulate matter trapped on the gasoline particulate filter. In specific embodiments, the particle size of Pt in the second composition is 2 to 20 nm, preferably 2 to 10 nm, more preferably 5 to 7 nm. In specific embodiments, the second composition may comprise from about 50 wt. % to about 99.9 wt. %, including about 60 wt. % to about 99.8 wt. %, including about 70 wt. % to about 99.6 wt. % of support material, based on the calcined weight of the second composition.

In one or more embodiments, the first PGM is Rh, or Rh and Pd, the first PGM is present in a catalytically effective amount to convert NOx, CO and hydrocarbons in an exhaust gas to $N_2$, $CO_2$ and $H_2O$. In specific embodiments, the first composition may comprise from about 50 wt. % to about 99.9 wt. %, including about 60 wt. % to about 99.8 wt. %, including about 70 wt. % to about 99.6 wt. % of support material, based on the calcined weight of the first composition.

In one or more embodiments, the second composition comprises at least one of ceria, zirconia, strontium oxide, strontium carbonate, strontium sulfate, barium oxide, barium carbonate, barium sulfate, manganese oxide. In specific embodiments, the second composition has a specific BET surface area after 4 hr calcination in air at 1000° C., characterized by 77K nitrogen sorption, in the range of 5 to 200 $m^2 \cdot g^{-1}$, preferably in the range of 7 to 100 $m^2 \cdot g^{-1}$, and more preferably in the range of 10 to 70 $m^2 \cdot g^{-1}$. In specific embodiments, the second composition further comprises alumina, hydrated alumina or doped alumina, wherein the dopant is at least one of ceria, zirconia, strontium oxide, strontium carbonate, strontium sulfate, barium oxide, barium carbonate, barium sulfate, and manganese oxide.

In one or more embodiments, the second composition comprises at least one organic material, such as acetic acid, oxalic acid, citric acid, tartaric acid, fumaric acid, lactic acid, malic acid, maleic acid, hexanol, octanol, decanol, cellulose, hydroxylethyl cellulose, methylhydroxylethyl cellulose, starch, polyethylene, polypropylene, polystyrene, poly(oxyethylene), poly(ethylene terephthalate), poly(butylene terephthalate), polyvinyl chloride, polyvinyl alcohol, polyvinylpyrrolidone, polymethyl methacrylate, polyamide, polycarbonates, or polyurethanes.

The major catalytic layer may be formed in a single layer or multiple layers. In some instances, it may be suitable to prepare one slurry of catalytic material and use this slurry to form multiple layers on the carrier. The catalytic layer can be readily prepared by processes well known in the prior art. A representative process is set forth below. As used herein, the term "washcoat" has its usual meaning in the art of a thin, adherent coating of a catalytic or other material applied to a substrate carrier material, such as a honeycomb-type carrier member, which is sufficiently porous to permit the passage there through of the gas stream being treated. A "washcoat layer," therefore, is defined as a coating that is comprised of support particles. A "catalyzed washcoat layer" is a coating comprised of support particles impregnated with catalytic compositions.

The major catalytic layer can be readily prepared in layers on a carrier. For a first layer of a specific washcoat, finely divided particles of a high surface area refractory metal oxide such as gamma alumina are dispersed in an appropriate vehicle, e.g., water to form a slurry. To incorporate components such as precious metals (e.g., palladium, rhodium, platinum, and/or combinations of the same), stabilizers and/or promoters, such components may be incorporated in the slurry as a mixture of water soluble or water-dispersible compounds or complexes. Typically, when palladium is desired, the palladium component is utilized in the form of a compound or complex to achieve dispersion of the component on the refractory metal oxide support. The term "palladium component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds are palladium nitrate or rhodium nitrate.

A suitable method of preparing any layer of the layered major catalytic layer of the invention is to prepare a mixture of a solution of a desired precious metal compound (e.g., palladium compound) and at least one support, such as a finely divided, high surface area, refractory metal oxide support, which is sufficiently dry to absorb substantially all of the solution to form a wet solid which later combined with water to form a coatable slurry. In one or more embodiments, the slurry is acidic, having, for example, a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds of oxygen storage components, e.g., cerium-zirconium composite, a stabilizer, e.g., barium acetate, and a promoter, e.g., lanthanum nitrate, may be added to the slurry.

In one or more embodiments, the major catalytic layer has a washcoat loading in the range of 10 to 170 g/L, preferably 25 to 150 g/L, more preferably 45 to 120 g/L.

In one or more embodiments, the minor functional material layer has a loading in the range of 1 to 15 g/L, preferably 1.5 to 12 g/L, more preferably 2 to 10 g/L.

In one or more embodiments, the minor functional material may be loaded in a particulate form. In other embodiments the minor functional material may be loaded in the form of a liquid suspension.

In preferably embodiments, the minor functional material is loaded in a particulate form via gas phase carrier, i.e. "dry loaded" without the use of any liquid carrier. Such dry loading may result in the distribution of the minor functional material within the filter more closely mimicking the distribution of non-minor functional material that becomes loaded onto a particulate filter during use. The catalyzed gasoline particulate filter applied with the 'dry loaded' minor functional material layer exhibited considerable improvement in conversion of all three categories of pollutant, especially HC and CO. Surprisingly, it has been found that an improvement of the soot combustion is achieved in the catalyzed gasoline particulate filter applied with the 'dry loaded' minor functional material layer.

Once loaded, the minor functional material may take the form of a packed bed. For example, when the particulate filter is a wall flow filter, the minor functional material may form a packed bed against the walls of the plurality of channels open at the inlet side. The packed bed may be formed in the channels open at the inlet side and against the sealant material closing the channels, i.e. towards the outlet end of the inlet channels. The packed bed is typically porous and is typically gas permeable, the pores being sized to trap particulate matter in a gasoline exhaust, for example soot. The pores of the packed bed are typically smaller than the pores of the porous substrate of the particulate filter. Alternatively, or in addition, the packed bed may be more porous than the walls of the porous substrate (i.e. it may provide a high level of filtration by the provision of a long path length). The packed bed may extend along the walls of the plurality of channels open at the inlet side. The packed bed may take the form of a layer or membrane, for example a continuous layer or membrane. The packed bed may extend along the entire length of the walls of the plurality of channels, or along only part of the length of the walls. Instead of being a packed bed, the minor functional material may be in the form of a porous coating, e.g. a coating applied as (i.e. derived from) a washcoat slurry. The porous coating may be arranged in a wall flow filter in a similar manner to the packed bed discussed above.

A further significant advantage according to one or more embodiments is that higher fresh filtration efficiency (FFE) can be achieved by reducing $D_{90}$. In some embodiments, the second functional material composition particulates has a Do of 1 to 50 µm, preferably 2 to 25 µm, and more preferably a $D_{90}$ of 3 to 20 µm.

"$D_{90}$" has its usual meaning of referring to the point where the cumulative weight from the small-particle-diameter side reaches 90% in the cumulative particle size distribution. $D_{90}$ is the value determined by measuring the particle size distribution, respectively. The particle size distribution is measured by using laser diffraction particle size distribution analyzer.

Other aspects include methods for the treatment of exhaust gas from a gasoline engine comprising providing a particulate filter according to previous embodiments; and conducting the exhaust gas from the engine through the particulate filter. The exhaust gas comprises unburnt hydrocarbons, carbon monoxide, nitrogen oxides, and particulate matter.

EXAMPLES

The present invention is more fully illustrated by the following examples, which are set forth to illustrate the present invention and is not to be construed as limiting thereof. Un-less otherwise noted, all parts and percentages are by weight, and all weight percentages are expressed on a dry basis, meaning excluding water content, unless otherwise indicated. In each of the examples, the carrier was cordierite.

Example 1—Comparative

A gasoline particulate filter having a catalytic material was prepared using double coats: a coat from inlet side and a coat from outlet side. The prior art catalyst composite for coating onto a gasoline particulate filter to oxidize particulate matter trapped in the filter at low temperatures and to abate nitrogen oxides, carbon monoxide, and hydrocarbons contained platinum, palladium and rhodium with a total precious metal loading of 16.5 $g/ft^3$ and with a Pt/Pd/Rh ratio of 5/6.5/5. The substrate had a volume of 2.0 L (122 $in^3$), a cell density of 300 cells per square inch, a wall thickness of approximately 200 μm, and a porosity of 63% and mean pore size of 19 μm in diameter by mercury intrusion measurements. The coat was prepared as follows:

The component applied from outlet side was a high surface area gamma alumina, a ceria-zirconia composite with 40% ceria by weight as oxygen storage component, palladium, rhodium, barium oxide and zirconia oxide, at concentrations of approximately 24.3%, 69.2%, 0.3%, 0.3%, 4.5% & 1.4%, respectively, based on the calcined weight of the catalyst. The barium oxide was introduced as a hydroxide solution. The zirconium oxide was introduced as a nitrate solution. The total loading of the coat was 1.01 $g/in^3$.

Rhodium in the form of a rhodium nitrate solution was impregnated by planetary mixer (P-mixer) onto the high surface area gamma alumina and the ceria zirconia composite to form a wet powder while achieving incipient wetness. Palladium in the form of a palladium nitrate solution was impregnated by planetary mixer (P-mixer) onto the high surface area gamma alumina and the ceria zirconia composite to form a wet powder while achieving incipient wetness. An aqueous slurry was formed. The barium solution and the zirconium solution were added. The slurry was milled to a particle size of 90% being 5 microns. The slurry was then coated onto the outlet side of the wall flow cordierite filter using deposition methods known in the art. After coating, the filter plus the outlet coat were dried and then calcined at a temperature of 550° C. for about 1 hour to give a half-way coated catalyzed filter.

The component applied from inlet side was a high surface area ceria-alumina composite with 50% ceria by weight, platinum, palladium, highly dispersible pseudo-boehmite Dispal® alumina hydrate, and zirconia oxide, at concentrations of approximately 94.7%, 1.1%, 0.3%, 2.0% & 2.0%, respectively, based on the calcined weight of the catalyst. The highly dispersible pseudo-boehmite Dispal® alumina hydrate was introduced as a aqueous dispersion. The zirconium oxide was introduced as an acetate solution. The total loading of the coat was 0.26 $g/in^3$.

Platinum in the form of an amine-complex solution was impregnated by planetary mixer (P-mixer) onto the high surface area ceria-alumina composite to form a wet powder while achieving incipient wetness. Palladium in the form of a palladium nitrate solution was impregnated by planetary mixer (P-mixer) onto the high surface area ceria-alumina composite to form a wet powder while achieving incipient wetness. An aqueous slurry was formed. The Dispal® dispersion and the zirconium solution were added. The slurry was milled to a particle size of 90% being 12 microns. The slurry was then coated onto the inlet side of the half-way coated catalyzed filter using deposition methods known in the art. After coating, the filter plus the outlet coat and the inlet coat were dried and then calcined at a temperature of 550° C. for about 1 hour.

Example 2

A gasoline particulate filter having a catalytic material was prepared using double coats: a major catalytic layer coated from outlet side and a minor functional material layer coated from outlet side. The catalyst composite contained platinum, palladium and rhodium with a total precious metal loading of 16.5 $g/ft^3$ and with a Pt/Pd/Rh ratio of 5/6.5/5. The substrate had a volume of 2.0 L (122 $in^3$), a cell density of 300 cells per square inch, a wall thickness of approximately 200 μm, and a porosity of 63% and mean pore size of 19 μm in diameter by mercury intrusion measurements. The coat was prepared as follows:

The major catalytic layer applied from outlet side was a high surface area gamma alumina, a ceria-zirconia composite with 40% ceria by weight as oxygen storage component, palladium, rhodium, barium oxide and zirconia oxide, at concentrations of approximately 24.3%, 69.2%, 0.3%, 0.3%, 4.5% & 1.4%, respectively, based on the calcined weight of the catalyst. The barium oxide was introduced as a hydroxide solution. The zirconium oxide was introduced as a nitrate solution. The total loading of the coat was 1.01 $g/in^3$.

Rhodium in the form of a rhodium nitrate solution was impregnated by planetary mixer (P-mixer) onto the high surface area gamma alumina and the ceria zirconia composite to form a wet powder while achieving incipient wetness. Palladium in the form of a palladium nitrate solution was impregnated by planetary mixer (P-mixer) onto the high surface area gamma alumina and the ceria zirconia composite to form a wet powder while achieving incipient wetness. An aqueous slurry was formed. The barium solution and the zirconium solution were added. The slurry was milled to a particle size of 90% being 5 microns. The slurry was then coated onto the outlet side of the wall flow cordierite filter using deposition methods known in the art. After coating, the filter plus the outlet coat were dried and then calcined at a temperature of 550° C. for about 1 hour to give a half-way coated catalyzed filter.

The minor functional material layer applied from inlet side was a high surface area ceria-alumina composite with 50% ceria by weight, platinum and palladium, at concentrations of approximately 98.6%, 1.1% and 0.3%, respectively, based on the calcined weight of the catalyst. Platinum in the form of an amine-complex solution was impregnated by planetary mixer (P-mixer) onto the high surface area ceria-alumina composite followed by palladium in the form of a palladium nitrate solution to form a wet powder while achieving incipient wetness. This powder was then calcined at a temperature of 550° C. for about 2 hours and was dry milled to a particle size of 90% being 5.1 microns, 50% being 2.1 microns, and 10% being 0.8 micron, of which the specific surface area (BET model, 77K nitrogen adsorption measurement) is 66 m$^2 \cdot$g$^{-1}$ after 4 hr calcination in air at 1000° C. The PGM containing high surface area ceria-alumina composite, in powder form, is mixed with gas carrier and blown-in into the part from inlet side at room temperature. The flow rate of gas carrier is 575 kg/hr. The loading of the minor functional material layer was 0.26 g/in$^3$.

Example 3

A catalyzed gasoline particulate filter according to Example 2, where the minor functional material layer applied from inlet side was dry milled to a particle size of 90% being 11.7 microns, 50% being 4.2 microns, and 10% being 1.4 micron. The loading of the minor functional material layer was 0.26 g/in$^3$.

Example 4

A catalyzed gasoline particulate filter according to Example 1 as half-way coated catalyzed filter.

The minor functional material layer applied from inlet side was barium sulfate. The barium sulfate powder has a particle size of 90% being 4.8 microns, 50% being 2.3 microns, and 10% being 0.9 micron, of which the specific surface area (BET model, 77K nitrogen adsorption measurement) is 3 m$^2 \cdot$g$^{-1}$ after 4 hr calcination in air at 1000° C. The loading of the minor functional material layer was 0.26 g/in$^3$.

Example 5—Testing

Figure 1:
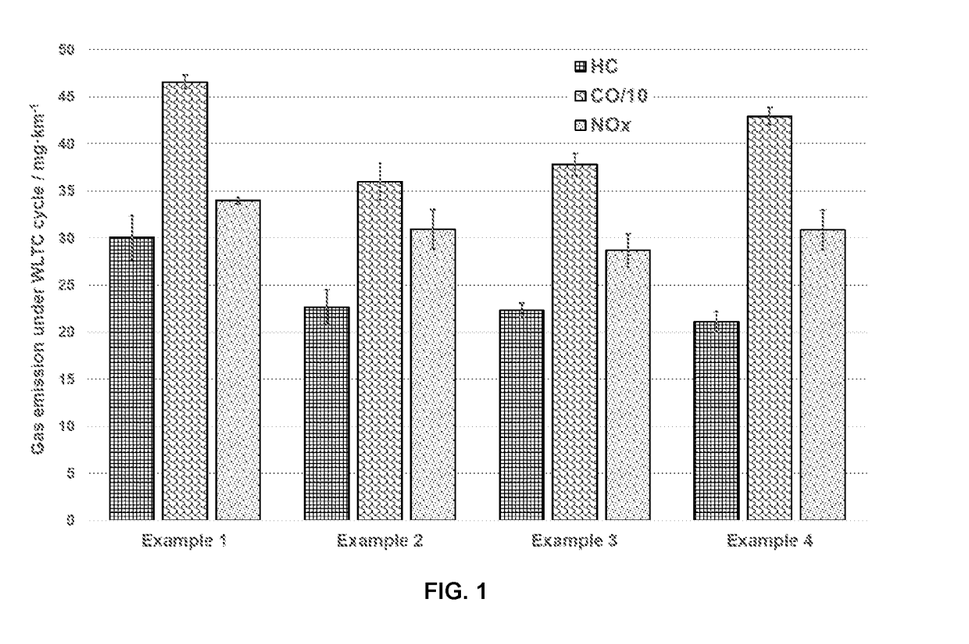
FIG. 1 shows a plot of gas phase pollutant emission for catalyzed gasoline particulate filters according to embodiments of the present invention and a prior art particulate filter at fresh state.

The ability of gasoline particulate filters according to Examples 1 to 4 for converting gaseous phase pollutants (unburnt HC, CO and NOx) was evaluated by putting these catalyzed filters in the first position after an SGE 1.5 L turbo gasoline direct injection engine (WLTC testing), and the results are shown in FIG. 1. The catalyzed gasoline particulate filter applied with the minor functional material layer exhibited considerable improvement in conversion of all three categories of pollutant, especially HC and CO.

Figure 2:
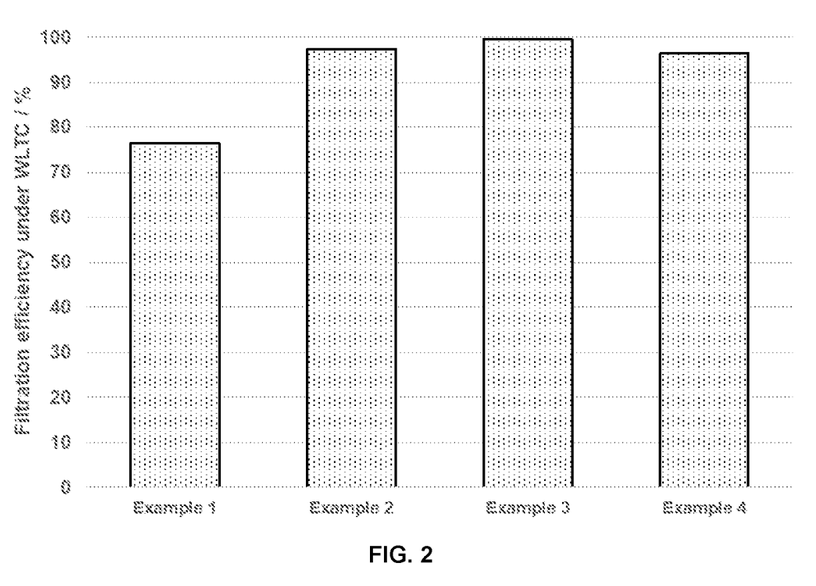
FIG. 2 shows a plot of filtration efficiencies of catalyzed gasoline particulate filters according to embodiments of the present invention and a prior art particulate filter.

The filtration efficiencies of Examples 1 to 4 at fresh state (0 km, or out-of-box state) were measured in the first position after an SGE 1.5 L turbo gasoline direct injection engine (WLTC testing; PN engine out=3.5×10$^{12}$ #/km), and the results are shown in FIG. 2. The catalyzed gasoline particulate filter applied with the minor functional material layer exhibited 20% increase in filtration efficiencies compared to a prior-art filter in which no minor functional material layer had been applied onto. Also noticeable is that at this relatively high washcoat loading (0.26 g/in$^3$ or 15 g/L), the difference in fresh filtration efficiency, caused by the nature or the particle size distribution of the minor functional layer is alleviated as examples 14, 15 and 16 all show comparable fresh filtration efficiency.

Example 6

A gasoline particulate filter having a catalytic material was prepared using double coats: a major catalytic layer coated from outlet side and a minor functional material layer coated from outlet side. The catalyst composite contained platinum and palladium with a total precious metal loading of 6.25 g/ft$^3$ and with a Pt/Pd/Rh ratio of 4/1/0. The substrate had a volume of 2.5 L (151 in$^3$), a cell density of 200 cells per square inch, a wall thickness of approximately 200 µm, and a porosity of 55% and mean pore size of 9 µm in diameter by mercury intrusion measurements. The coat was prepared as follows:

The major catalytic layer applied from outlet side was a was a high surface area ceria-alumina composite with 50% ceria by weight, platinum, palladium, highly dispersible pseudo-boehmite Dispal® alumina hydrate, and zirconia oxide, at concentrations of approximately 94.7%, 1.1%, 0.3%, 1.9% & 1.9%, respectively, based on the calcined weight of the catalyst. The highly dispersible pseudo-boehmite Dispal® alumina hydrate was introduced as an aqueous dispersion. The zirconium oxide was introduced as an acetate solution. The total loading of the coat was 0.20 g/in$^3$.

Platinum in the form of an amine-complex solution was impregnated by planetary mixer (P-mixer) onto the high surface area ceria-alumina composite to form a wet powder while achieving incipient wetness. Palladium in the form of a palladium nitrate solution was impregnated by planetary mixer (P-mixer) onto the high surface area ceria-alumina composite to form a wet powder while achieving incipient wetness. An aqueous slurry was formed. The Dispal® dispersion and the zirconium solution were added. The slurry was milled to a particle size of 90% being 12 microns. The slurry was then coated onto the outlet side of the wall flow cordierite filter using deposition methods known in the art. After coating, the filter plus the outlet coat were dried and then calcined at a temperature of 550° C. for about 1 hour.

The minor functional material layer applied from inlet side was a high surface area ceria-alumina composite with 50% ceria by weight, platinum and palladium, at concentrations of approximately 98.6%, 1.1% and 0.3%, respectively, based on the calcined weight of the catalyst. Platinum in the form of an amine-complex solution was impregnated by planetary mixer (P-mixer) onto the high surface area ceria-alumina composite followed by palladium in the form of a palladium nitrate solution to form a wet powder while achieving incipient wetness. This powder was then calcined at a temperature of 550° C. for about 2 hours and was dry milled to a particle size of 90% being 5.1 microns, 50% being 2.1 microns, and 10% being 0.8 micron, of which the specific surface area (BET model, 77K nitrogen adsorption measurement) is 66 m$^2 \cdot$g$^{-1}$ after 4 hr calcination in air at 1000° C. The PGM containing high surface area ceria-alumina composite, in powder form, is mixed with gas carrier and blown-in into the part from inlet side at room temperature. The flow rate of gas carrier is 575 kg/hr. The loading of the minor functional material layer was 0.06 g/in$^3$.

Example 7

A catalyzed gasoline particulate filter according to Example 6, wherein the slurry of the major catalytic layer was milled to a particle size of 90% being 5 microns.

Example 8

A gasoline particulate filter having a catalytic material was prepared using single from inlet side. The catalyst composite contained platinum and palladium with a total precious metal loading of 6.25 g/ft³ and with a Pt/Pd/Rh ratio of 4/1/0. The substrate had a volume of 2.5 L (151 in³), a cell density of 200 cells per square inch, a wall thickness of approximately 200 µm, and a porosity of 55% and mean pore size of 9 µm in diameter by mercury intrusion measurements. The coat was prepared as follows:

The catalytic material applied from inlet side was a high surface area ceria-alumina composite with 50% ceria by weight, platinum and palladium, at concentrations of approximately 98.6%, 1.1% and 0.3%, respectively, based on the calcined weight of the catalyst. Platinum in the form of an amine-complex solution was impregnated by planetary mixer (P-mixer) onto the high surface area ceria-alumina composite followed by palladium in the form of a palladium nitrate solution to form a wet powder while achieving incipient wetness. This powder was then calcined at a temperature of 550° C. for about 2 hours and was dry milled to a particle size of 90% being 5.1 microns, 50% being 2.1 microns, and 10% being 0.8 micron, of which the specific surface area (BET model, 77K nitrogen adsorption measurement) is 66 $m^2 \cdot g^{-1}$ after 4 hr calcination in air at 1000° C. The PGM containing high surface area ceria-alumina composite, in powder form, is mixed with gas carrier and blown-in into the part from inlet side at room temperature. The flow rate of gas carrier is 575 kg/hr. The loading of the minor functional material layer was 0.26 g/in³.

Example 9—Testing

Figure 3:
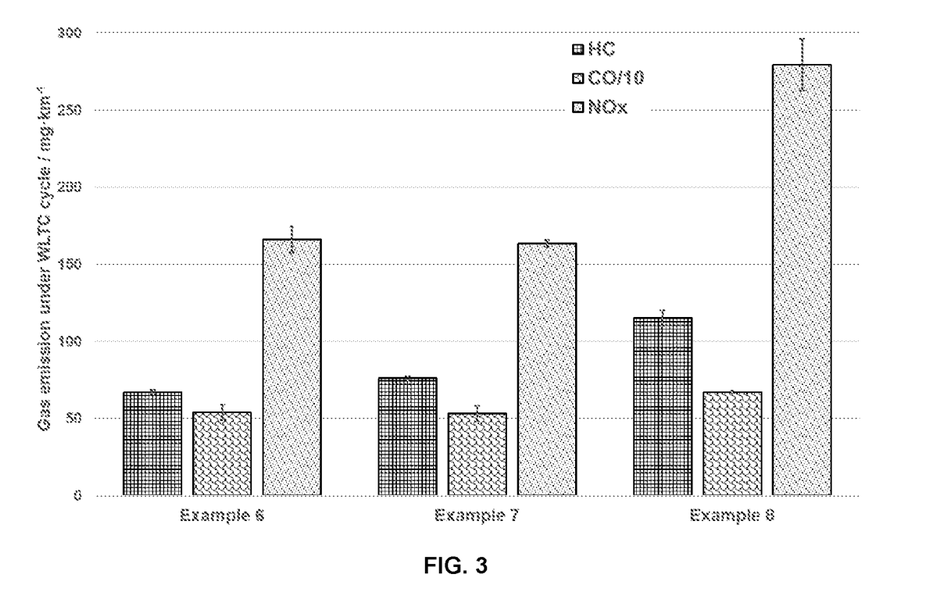
FIG. 3 shows a plot of gas phase pollutant emission for catalyzed gasoline particulate filters according to embodiments of the present invention at fresh state.
Figure 4:
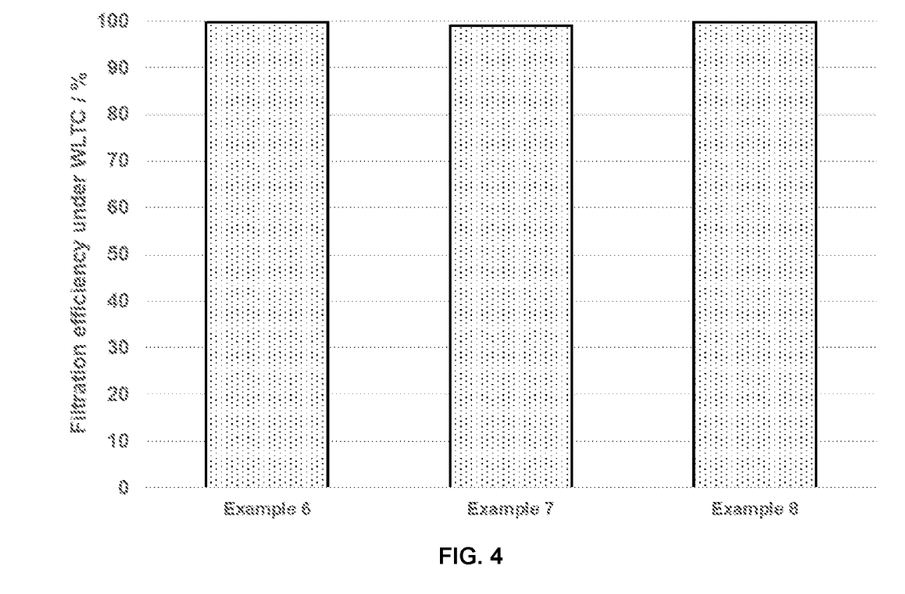
FIG. 4 shows a plot of filtration efficiencies of catalyzed gasoline particulate filters according to embodiments of the present invention.

The gaseous phase pollutants conversion ability and filtration efficiencies of Examples 6 to 8 at fresh state (0 km, or out-of-box state) were measured in the first position after an SGE 1.5 L turbo gasoline direct injection engine (WLTC testing; PN engine out=$3.5 \times 10^{12}$ #/km), and the results are shown in FIG. 3 and FIG. 4, respectively. Similar fresh filtration efficiency was observed for these examples and catalyzed filters with both major catalytic layer and minor functional material layer (Examples 6 and 7) showed significantly better TWC activity than sample loaded with powder only (Example 8).

Example 10—Comparative

A gasoline particulate filter having a catalytic material was prepared using single coat from inlet side. The prior art three-way conversion (TWC) catalyst composite contained palladium and rhodium with a total precious metal loading of 7 g/ft³ and with a Pt/Pd/Rh ratio of 0/2/5. The substrate had a volume of 2.5 L (151 in³), a cell density of 300 cells per square inch, a wall thickness of approximately 200 µm, and a porosity of 63% and mean pore size of 19 µm in diameter by mercury intrusion measurements. The coat was prepared as follows:

The component applied from inlet side was a high surface area gamma alumina, a ceria-zirconia composite with 40% ceria by weight as oxygen storage component, palladium, rhodium, barium oxide and zirconia oxide, at concentrations of approximately 24.8%, 68.7%, 0.1%, 0.2%, 5.0% & 1.3%, respectively, based on the calcined weight of the catalyst. The barium oxide was introduced as a hydroxide solution. The zirconium oxide was introduced as a nitrate solution. The total loading of the coat was 1.23 g/in³.

Rhodium in the form of a rhodium nitrate solution was impregnated by planetary mixer (P-mixer) onto the high surface area gamma alumina and the ceria zirconia composite to form a wet powder while achieving incipient wetness. Palladium in the form of a palladium nitrate solution was impregnated by planetary mixer (P-mixer) onto the high surface area gamma alumina and the ceria zirconia composite to form a wet powder while achieving incipient wetness. An aqueous slurry was formed. The barium solution and the zirconium solution were added. The slurry was milled to a particle size of 90% being 5 microns. The slurry was then coated onto the inlet side of the wall flow cordierite filter using deposition methods known in the art. After coating, the filter plus the inlet coat were dried and then calcined at a temperature of 550° C. for about 1 hour.

Example 11

A catalyzed gasoline particulate filter according to Example 10, where the prior art three-way conversion (TWC) catalyst composite was the major catalytic layer and an additional minor functional material layer was loaded into the inlet side of the filter.

The minor functional material layer applied from inlet side was a high surface area gamma alumina. The alumina was dry milled to a particle size of 90% being 5 microns, 50% being 2.5 microns, and 10% being 1 micron, of which the specific surface area (BET model, 77K nitrogen adsorption measurement) is 70 $m^2 \cdot g^{-1}$ after 4 hr calcination in air at 1000° C. The high surface area gamma alumina, in powder form, is mixed with gas carrier and blown-in into the part at room temperature. The flow rate of gas carrier is 575 kg/hr. The loading of the minor functional material layer was 0.066 g/in³.

Example 12

A catalyzed gasoline particulate filter according to Example 11, where the loading of the minor functional material layer was 0.041 g/in³.

Example 13

A catalyzed gasoline particulate filter according to Example 11, where the loading of the minor functional material layer was 0.024 g/in³.

Example 14

A catalyzed gasoline particulate filter prepared in the same way as Example 11, where the minor functional layer applied was a high surface area gamma alumina. The alumina was dry milled to a particle size of 90% being 16 microns, 50% being 6.9 microns, and 10% being 2.0 micron, of which the specific surface area (BET model, 77K nitrogen adsorption measurement) is 76 $m^2 \cdot g^{-1}$ after 4 hr calcination in air at 1000° C. The loading of the minor functional material layer was 0.066 g/in³.

Example 15

A catalyzed gasoline particulate filter prepared in the same way as Example 11, where the minor functional layer applied was a high surface area gamma alumina. The alumina was dry milled to a particle size of 90% being 25.4 microns, 50% being 10.9 microns, and 10% being 2.4 micron, of which the specific surface area (BET model, 77K nitrogen adsorption measurement) is 75 $m^2 \cdot g^{-1}$ after 4 hr calcination in air at 1000° C. The loading of the minor functional material layer was 0.066 g/in³.

Example 16

A catalyzed gasoline particulate filter prepared in the same way as Example 11, where the minor functional layer applied further comprises a powder of polyvinyl alcohol. The polyvinyl alcohol PVA-1788 was obtained as fine powder with particle size at 230 mesh. The PVA powder was premixed with dry-milled high surface area gamma alumina at a 1:5 ratio in weight. The mixed powder is further mixed with gas carrier and blown-in into the part at room temperature. The flow rate of gas carrier is 575 kg/hr. The total loading of the minor functional material layer was 0.079 g/in$^3$.

Example 17—Testing

Figure 5:
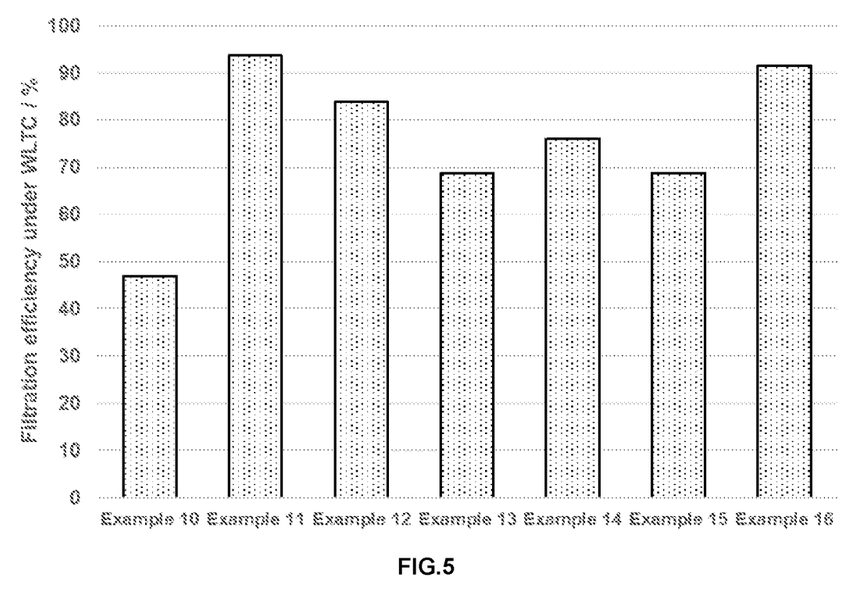
FIG. 5 shows a plot of filtration efficiencies of catalyzed gasoline particulate filters according to embodiments of the present invention and a prior art particulate filter.

The filtration efficiencies of Examples 10 to 16 at fresh state (0 km, or out-of-box state) were measured in the first position (SGE 1.5 L turbo gasoline direct injection engine; WLTC testing; PN engine out=$3.5\times10^{12}$ #/km), and the results are shown in FIG. 5. The catalyzed gasoline particulate filter applied with the minor functional material layer exhibited significant increase in filtration efficiencies compared to a prior-art filter in which no minor functional material layer had been applied onto. Noticeably, the filtration efficiency increase is already very significant (+24%, Examples 10 vs. 13) at functional layer loading as low as 0.024 g/in$^3$. In addition, filtration efficiency of examples according to embodiments of the present invention further improves by applying higher loading of the minor functional material layer, as demonstrated by Examples 11 and 12. An optimized particle size distribution of the functional layer was demonstrated by examples 11, 14 and 15, where higher filtration efficiency (FFE) is achieved with reduced particles size $D_{90}$ from 25 μm to 16 μm and further to 5 μm. With the addition of organic materials (in Example 16), catalyzed gasoline particulate filter prepared according to this example maintains its high filtration efficiency.

The invention claimed is:

1. A catalyzed particulate filter for exhaust gas from a gasoline engine comprising:
   (1) a gasoline particulate filter (GPF);
   (2) a major catalytic layer coated onto or within an inlet side, an outlet side, or both sides of the GPF surfaces, wherein the major catalytic layer comprising a first composition, the first composition comprises a first support material; and a first platinum group metal (PGM); and
   (3) a minor functional material layer placed onto or within an inlet side, an outlet side, or both sides of the GPF surfaces; the minor catalytic layer comprising a second composition;
   (4) wherein the major catalytic layer has a higher loading than the minor functional material layer;
   (5) wherein the minor functional material layer is placed on top of the major catalytic layer, or the major catalytic layer is placed on top of the minor functional material layer;
   (6) wherein the minor functional material layer is dry loaded in a particulate form; and
   (7) wherein the second composition comprises at least one of ceria, zirconia, strontium oxide, strontium carbonate, strontium sulfate, barium oxide, barium carbonate, barium sulfate, and manganese oxide, the second composition has a specific BET surface area after 4 hr calcination in air at 1000° C., characterized by 77 K nitrogen sorption, ranging from 5 m$^2$ g$^{-1}$ to 200 m$^2$ g$^{-1}$.

2. The catalyzed particulate filter according to claim 1, wherein the second composition comprises a second support material; and a second platinum group metal.

3. The catalyzed particulate filter according to claim 2, wherein the first and second support materials are independently chosen from alumina, zirconia, ceria, silica, titania, a rare earth metal oxide other than ceria, and mixtures thereof.

4. The catalyzed particulate filter according to claim 2, wherein the first and second PGM are independently chosen from platinum (Pt), palladium (Pd), rhodium (Rh) and mixtures thereof.

5. The catalyzed particulate filter according to claim 4, wherein the second PGM is Pt, or Pt and Pd, and the second PGM is present in a catalytically effective amount to convert NOx, CO and hydrocarbons in an exhaust gas to $N_2$, $CO_2$ and $H_2O$ and to cause the oxidation of particulate matter trapped on the gasoline particulate filter.

6. The catalyzed particulate filter according to claim 4, wherein the first PGM is Rh, or Rh and Pd, and the first PGM is present in a catalytically effective amount to convert NOx, CO and hydrocarbons in an exhaust gas to $N_2$, $CO_2$ and $H_2O$.

7. The catalyzed particulate filter according to claim 1, wherein the second composition further comprises alumina, hydrated alumina or doped alumina, and wherein the dopant is at least one of ceria, zirconia, strontium oxide, strontium carbonate, strontium sulfate, barium oxide, barium carbonate, barium sulfate, manganese oxide.

8. The catalyzed particulate filter according to claim 1, wherein the second composition further comprises an organic material chosen from one or more of acetic acid, oxalic acid, citric acid, tartaric acid, fumaric acid, lactic acid, malic acid, maleic acid, hexanol, octanol, decanol, cellulose, hydroxylethyl cellulose, methylhydroxylethyl cellulose, starch, polyethylene, polypropylene, polystyrene, poly(oxyethylene), poly(ethylene terephthalate), poly(butylene terephthalate), polyvinyl chloride, polyvinyl alcohol, polyvinylpyrrolidone, polymethyl methacrylate, polyamide, polycarbonates, and polyurethanes.

9. The catalyzed particulate filter according to claim 1, wherein the major catalytic layer has a washcoat loading ranging from 10 g/L to 170 g/L.

10. The catalyzed particulate filter according to claim 1, wherein the minor functional material layer has a loading ranging from 1 g/L to 15 g/L.

11. The catalyzed particulate filter according to claim 1, wherein particulates in the second composition have a $D_{90}$ ranging from 1 μm to 50 μm.

12. A method for the treatment of exhaust gas from a gasoline engine comprising:
   (1) providing a particulate filter according to claim 1, and
   (2) conducting the exhaust gas from the engine through the particulate filter.

13. The method according to claim 12, wherein the exhaust gas comprises unburnt hydrocarbons, carbon monoxide, nitrogen oxides, and particulate matter.

14. The catalyzed particulate filter according to claim 8, wherein the organic material in the second composition is in a form of a dry powder mixed with other components in the second composition.

15. The catalyzed particulate filter according to claim 14, wherein the organic material in the second composition is polyvinyl alcohol powder.

16. The catalyzed particulate filter according to claim 11, wherein the particulates of the second composition have a $D_{50}$ ranging from 2 μm to 11 μm.

17. The catalyzed particulate filter according to claim 11, wherein the particulates of the second composition have a $D_{10}$ ranging from 0.8 μm to 2.5 μm.

\* \* \* \* \*